United States Patent
Wada et al.

[11] Patent Number: 5,801,111
[45] Date of Patent: Sep. 1, 1998

[54] DIELECTRIC CERAMIC COMPOSITION AND MONOLITHIC CERAMIC CAPACITOR USING THE SAME

[75] Inventors: Hiroyuki Wada, Shiga-ken; Harunobu Sano, Kyoto; Norihiko Sakamoto, Shiga-ken; Yukio Hamaji, Otsu, all of Japan

[73] Assignee: Murata Manufacturing Co., Ltd., Kyoto, Japan

[21] Appl. No.: 785,783

[22] Filed: Jan. 21, 1997

[30] Foreign Application Priority Data

| | | | |
|---|---|---|---|
| Jan. 18, 1996 | [JP] | Japan | 8-006530 |
| Mar. 18, 1996 | [JP] | Japan | 8-061357 |
| Nov. 1, 1996 | [JP] | Japan | 8-291998 |

[51] Int. Cl.$^6$ .......... C04B 35/462; H01G 4/10; H01G 7/00
[52] U.S. Cl. .......... 501/138; 501/139; 501/32; 361/321.1; 361/321.2
[58] Field of Search .......... 501/138, 139, 501/32; 361/321.1, 321.2

[56] References Cited

U.S. PATENT DOCUMENTS 5,181,157  1/1993  Chazono et al. .......... 361/321

OTHER PUBLICATIONS

Patent Abstracts of Japan, vol. 096, No. 002, 29 Feb. 1996 & JP 07 272973 Oct. 20, 1995.

*Primary Examiner*—Deborah Jones
*Attorney, Agent, or Firm*—Ostrolenk, Faber, Gerb & Soffen, LLP

[57] ABSTRACT

Disclosed herein is a dielectric ceramics composition which comprises 100 moles of a primary component being a barium titanate (containing less than about 0.02 wt % of alkali metal oxide as an impurity) as expressed by the compositional formula:

$$(1-\alpha-\beta-\gamma)\{BaO\}_m \cdot TiO_2 + \alpha M_2O_3 + \beta Re_2O_3 + \gamma(Mn_{1-x-y}Ni_xCo_y)O$$

(where $M_2O_3$ denotes $Sc_2O_3$ or $Y_2O_3$ or both, $Re_2O_3$ denotes $Sm_2O_3$ or $Eu_2O_3$ or both, $0.0025 \leq \alpha+\beta \leq 0.025$, $0 < \beta \leq 0.0075$, $0.0025 \leq \gamma \leq 0.05$, $\gamma/(\alpha+\beta) \leq 4$, $0 \leq x < 1.0$, $0 \leq y < 1.0$, $0 \leq x+y < 1.0$, and $1.0000 < m \leq 1.035$; from about 0.5–5 moles of MgO; and, about 0.2–3 pbw per 100 pbw of primary component and MgO, said auxiliary component being an oxide represented by $Li_2O—(Si,Ti)O_2—Al_2O_3—ZrO_2$. Also disclosed is a laminated ceramic capacitor made therefrom. The dielectric ceramic composition can be sintered without becoming a semiconductor even when sintered in an atmosphere having a low oxygen partial pressure and has a permittivity higher than 3000 and also has an insulation resistance and an electrostatic capacity such that their product (CR) is greater than 6000 $\Omega \cdot F$.

16 Claims, 1 Drawing Sheet

DIELECTRIC CERAMIC COMPOSITION AND MONOLITHIC CERAMIC CAPACITOR USING THE SAME

BACKGROUND OF THE INVENTION

1. Field of the Invention

The present invention relates to a dielectric ceramics composition and a laminated ceramics capacitor made therefrom, especially a laminated ceramics capacitor provided with internal electrodes of nickel or nickel alloy.

2. Description of the Prior Art

Conventional dielectric materials which are composed mainly of barium titanate and used for ceramics capacitors pose a problem of becoming a semiconductor as the result of reduction upon firing in a neutral or reducing atmosphere having a low oxygen partial pressure. Therefore, it is necessary to make internal electrodes from precious metal (such as palladium and platinum) which does not melt at the sintering temperature of the dielectric ceramic materials during firing in an atmosphere having a high oxygen partial pressure which prevents the dielectric ceramics material from becoming a semiconductor. This is a great hindrance to cost reduction of laminated ceramics capacitors.

One way to address the above-mentioned problem is to make internal electrodes from an inexpensive base metal such as nickel. Unfortunately, such internal electrodes become oxidized (and hence become useless) upon firing under the conventional conditions. To avoid this problem it is necessary to use a dielectric ceramic composition which does not become a semiconductor but becomes a dielectric ceramic having sufficient resistivity and good dielectric properties even when fired in a neutral or reducing atmosphere having a low oxygen partial pressure.

Those materials meeting this condition have been proposed as follows:

- A composition based on $BaTiO_3$—$CaZrO_3$—$MnO$—$MgO$, as disclosed in Japanese Patent Laid-open No. 256422/1987.
- A composition based on $BaTiO_3$—$MnO$—$MgO$-rare earth oxide, as disclosed in Japanese Patent Laid-open No. 103861/1985.
- A composition based on $BaTiO_3$—$(Mg, Zn, Sr, Ca)O$—$Li_2O$—$SiO_2$—$Mo$ (where MO denotes BaO, SrO, or CaO), as disclosed in Japanese Patent Publication No. 14610/1986.

The above-mentioned first composition (which is a non-reducible dielectric ceramic composition) suffers the disadvantage that $CaZrO_3$ and $CaTiO_2$ (which form during firing) combine with Mn to cause heterogeneity. This poses the problem of decrease in reliability at high temperatures.

The above-mentioned second composition (which is a non-reducible dielectric ceramic composition) suffers the disadvantage that its insulation resistance and capacity are greatly affected by the grain size of $BaTiO_3$ principal component. This causes difficulties in producing stable characteristic properties. In addition, it has an unpractically low CR value (the product of insulation resistance and electrostatic capacity) of 1000–2000 Ω·F.

The above-mentioned third composition suffers the disadvantage of giving rise to a dielectric material having a permittivity of 2000–2800, which is inferior to conventional compositions containing precious metal (such as palladium) which have a permittivity of 3000–3500. Therefore, it will not meet the requirements for a capacitor having a smaller size and a large capacity if it is used to replace conventional materials only for cost reduction.

In addition, the non-reducible dielectric ceramic compositions proposed so far suffer the disadvantage of greatly decreasing in resistance at high temperatures although they have high insulation resistance at room temperature. A remarkable decrease in resistance occurs especially in a strong electric field. This is a great hindrance to the reduction of thickness of dielectric layers. This is the reason why there has been no practical thin-layer laminated capacitors made of non-reducible dielectric ceramics compositions. Moreover, as compared with the prior art technology that employs internal electrodes of precious metal (such as palladium), they are poor in reliability at high temperatures under high humidity (the so-called moisture-resistant load characteristics).

In order to address the above-mentioned problems, the present inventors have proposed some new non-reducible dielectric ceramics compositions in Japanese Patent Laid-open Nos. 9066–9068/1993. Recent requirements for improved performance at high temperatures under high humidity have made it necessary to propose new compositions having even better characteristic properties.

OBJECT AND SUMMARY OF THE INVENTION

It is an object of the present invention to provide a dielectric ceramics composition which can be sintered without the possibility of becoming a semiconductor even when sintered in an atmosphere having a low oxygen partial pressure and which has a permittivity higher than 3000 and also an insulation resistance and an electrostatic capacity such that their product (CR) is greater than 6000 Ω·F. It is another object of the present invention to provide a laminated ceramics capacitor having the following features.

A small rate of decrease in insulation resistance in a strong electric field.

High reliability despite thin dielectric layers.

High rated voltage.

Temperature characteristics of electrostatic capacity meeting the B specification prescribed in JIS and the X7R specification prescribed in EIA.

Good load characteristics at high temperatures under high humidity.

Small size and high capacity.

The first aspect of the present invention resides in a dielectric ceramic composition which comprises a primary component and a secondary component in a molar ratio of from about 100/0.5 to 100/5.0 and an auxiliary component in an amount of from about 0.2 to 3.0 pbw for 100 pbw in total of said primary and secondary components, said primary component being composed of barium titanate (containing less than about 0.02 wt % of alkali metal oxide as an impurity), scandium oxide, yttrium oxide, samarium oxide, europium oxide, manganese oxide, cobalt oxide, and nickel oxide, as expressed by the compositional formula below:

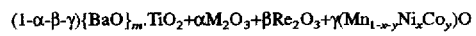

(where $M_2O_3$ denotes $Sc_2O_3$ or $Y_2O_3$ or both, $Re_2O_3$ denotes $Sm_2O_3$ or $Eu_2O_3$ or both, α, β, γ, m, x, and y are defined by:

$0.0025 \leq \alpha+\beta \leq 0.025$ $0 < \beta \leq 0.0075$ $0.0025 \leq \gamma \leq 0.05$ $\gamma/(\alpha+\beta) \leq 4$ $0 \leq x < 1.0$ $0 \leq y < 1.0$ $0 \leq x+y < 1.0$ $1.0000 < m \leq 1.035$ said secondary component being magnesium oxide (MgO), and said auxiliary component being an oxide represented by $Li_2O-(Si,Ti)O_2-Al_2O_3-ZrO_2$.

The second aspect of the present invention resides in a dielectric ceramic composition as defined above, wherein the oxide represented by $Li_2O-(Si,Ti)O_2-Al_2O_3-ZrO_2$ is one which is represented by the general formula of $pLi_2O-q(Si_zTi_{1-z})O_2-rM$ (where p, q, and r denote the mol % of the respective constituents, z is defined by $0.30 \leq z \leq 1.0$, M stands for $Al_2O_3$ or $ZrO_2$ or both, and p, q, and r are within the area enclosed by the polygon having apexes defined as follows on a triangular composition diagram.

A (20, 80, 0)

B (10, 80, 10)

C (10, 70, 20)

D (35, 45, 20)

E (45, 45, 10)

F (45, 55, 0)

provided that $0.3 \leq z < 1.0$ for the composition corresponding to the line A–F.

The third aspect of the present invention resides in a laminated ceramic capacitor of the type having a plurality of dielectric ceramic layers, a plurality of internal electrodes formed between said dielectric ceramic layers such that their edges are exposed at the ends of the ceramic layers, and external electrodes electrically connected to the edges of said internal electrodes, wherein said dielectric ceramics layers are made from a dielectric ceramic composition defined below and said internal electrodes are made from nickel or nickel alloy. A dielectric ceramic composition which comprises a primary component and a secondary component in a molar ratio of from about 100/0.5 to 100/5.0 and an auxiliary component in an amount of from 0.2 to 3.0 pbw for 100 pbw in total of said primary and secondary components, said primary component being composed of barium titanate (containing less than about 0.02 wt % (preferably less than about 0.15%) of alkali metal oxide as an impurity), scandium oxide, yttrium oxide, samarium oxide, europium oxide, manganese oxide, cobalt oxide, and nickel oxide, as expressed by the compositional formula below:

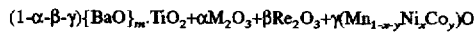

$(1-\alpha-\beta-\gamma)\{BaO\}_m \cdot TiO_2 + \alpha M_2O_3 + \beta Re_2O_3 + \gamma(Mn_{1-x-y}Ni_xCo_y)O$ (where $M_2O_3$ denotes $Sc_2O_3$ or $Y_2O_3$ or both, $Re_2O_3$ denotes $Sm_2O_3$ or $Eu_2O_3$ or both, $\alpha, \beta, \gamma, m, x$, and $y$ are defined by:

$0.0025 \leq \alpha+\beta \leq 0.025$ $0 < \beta \leq 0.0075$ $0.0025 \leq \gamma \leq 0.05$ $\gamma/(\alpha+\beta) \leq 4$ $0 \leq x < 1.0$ $0 \leq y < 1.0$ $0 \leq x+y < 1.0$ $1.0000 < m \leq 1.035$ said secondary component being magnesium oxide (MgO), and said auxiliary component being an oxide represented by $Li_2O-(Si,Ti)O_2-Al_2O_3-ZrO_2$. Preferably, $0.0075 \leq \alpha + \beta \leq 0.0175$, $0.0005 < \beta \leq 0.006$, $0.015 \leq \gamma \leq 0.035$, $\gamma/(\alpha+\beta) \leq 3.3$, $0.05 \leq x \leq 0.6$, $0.1 \leq y \leq 0.6$, $0.2 \leq x+y \leq 0.6$, $1.005 < m \leq 1.015$, the amount of MgO is about 0.6–2 moles and the amount of oxide glass is about 0.5–1.5 pbw.

The fourth aspect of the present invention resides in a laminated ceramic capacitor as defined in the third aspect, wherein the oxide represented by $Li_2O-(Si,Ti)O_2-Al_2O_3-ZrO_2$ is one which is represented by the general formula of $pLi_2O-q(Si_zTi_{1-z})O_2-rM$ (where p, q, and r denote the mol % of the respective constituents, z is defined by $0.30 \leq z \leq 1.0$ and is preferably about 0.4 to 0.8, M stands for $Al_2O_3$ or $ZrO_2$ or both, and p, q, and r are within the area enclosed by the polygon having apexes defined as follows in the triangular coordinates.

A (20, 80, 0)

B (10, 80, 10)

C (10, 70, 20)

D (35, 45, 20)

E (45, 45, 10)

F (45, 55, 0)

provided that $0.3 \leq z < 1.0$ for the composition corresponding to the line A–F.

The fifth aspect of the present invention resides in a laminated ceramic capacitor as defined in the third aspect, wherein the external electrodes are constructed of sintered layers of electrically conductive metal powder containing or not containing glass frit.

The sixth aspect of the present invention resides in a laminated ceramic capacitor as defined in the third or fifth aspect, wherein the external electrodes are constructed of sintered layers of electrically conductive metal powder containing or not containing glass frit, said sintered layers having a plated layer thereon.

DESCRIPTION OF THE PREFERRED EMBODIMENTS

EXAMPLE 1

Figure 1:
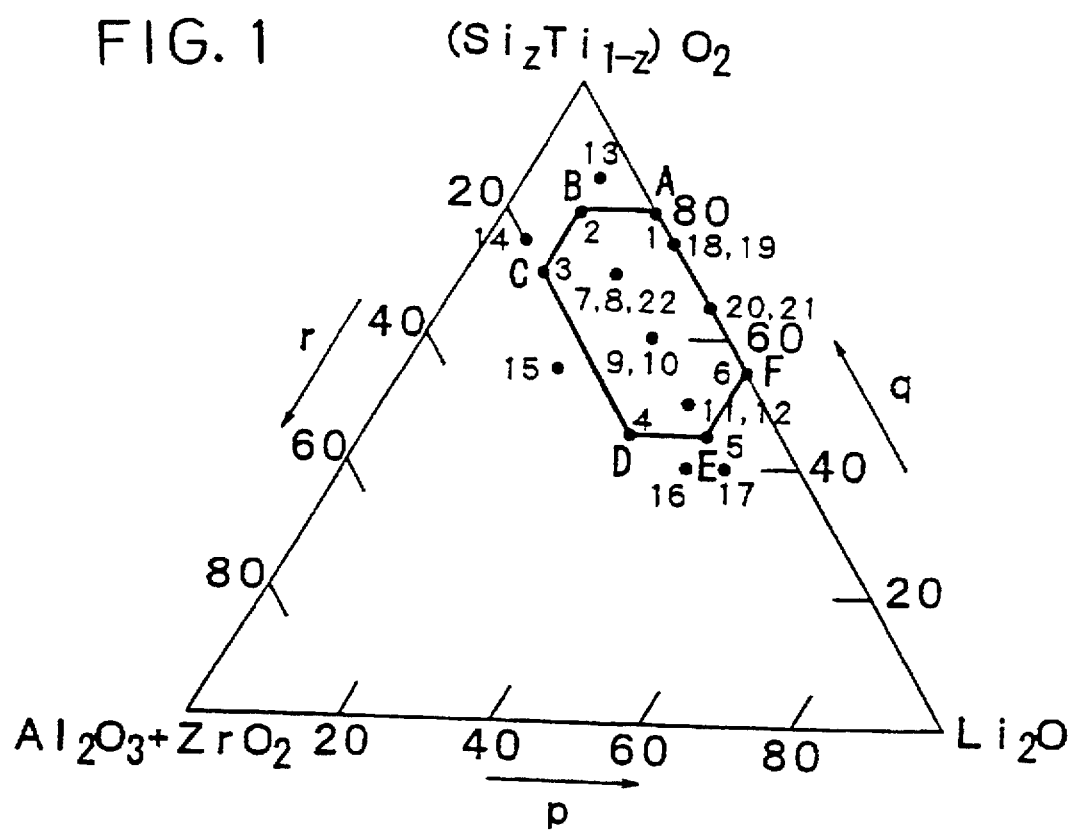
FIG. 1 is a diagram (triangular coordinates) showing the compositional variables of three components constituting the oxide glass contained in the dielectric ceramic composition.

Four kinds of barium titanate ($BaTiO_3$) as shown in Table 1 were prepared from $TiCl_4$ and $Ba(NO_3)_2$ (both varying in purity) in prescribed amounts by precipitation in the form of barium titanyl oxalate ($BaTiO(C_2O_4) \cdot 4H_2O$) with oxalic acid, followed by pyrolysis at 1000° C. or above.

TABLE 1

| Designation of $BaTiO_3$ | Content of impurities (wt %) | | | | | Average grain size (μm) |
|---|---|---|---|---|---|---|
| | Alkali metal oxide | SrO | CaO | $SiO_2$ | $Al_2O_3$ | |
| A | 0.003 | 0.012 | 0.001 | 0.010 | 0.005 | 0.60 |
| B | 0.020 | 0.010 | 0.003 | 0.019 | 0.008 | 0.56 |
| C | 0.012 | 0.179 | 0.018 | 0.155 | 0.071 | 0.72 |
| D | 0.062 | 0.014 | 0.001 | 0.019 | 0.004 | 0.58 |

A powder was prepared from oxides, carbonates, and hydroxides of respective components for the compositional formula 0.25 $Li_2O$-0.65 (0.30 $TiO_2$.0.70 $SiO_2)_2$)-0.10 $Al_2O_3$ (molar ratio) by mixing, crushing, evaporation, and drying. This powder was made into an oxide glass powder having an average grain size smaller than about 1 μm (preferably smaller than about 0.75 μm) by melting at 1300° C., quenching, and crushing.

Each sample in powder form was prepared by mixing from barium titanate (prepared as mentioned above), $BaCO_3$ (to adjust the Ba/Ti molar ratio m in barium titanate), oxide glass powder (prepared as mentioned above), and $Sc_2O_3$, $Y_2O_3$, $Sm_2O_3$, $Eu_2O_3$, $MnCO_3$, $NiO$, $Co_2O_3$, and $MgO$, all of which have a purity higher than 99%, as much as necessary to conform to the compositional formula shown in Table 2.

The powder mixture obtained as mentioned above was mixed with a binder (polyvinyl butyral) and an organic solvent (ethanol) by wet ball-milling to give a ceramics slurry. By using the doctor blade method, the slurry was made into a rectangular ceramic green sheet, 11 μm thick. The green sheet was coated with a nickel-based conductive paste by printing, so as to form a conductive paste layer which becomes the internal electrode afterward.

Several pieces of the green sheets, each having the conductive paste layer, were placed one on top of another to give a laminate such that the conductive paste layers exposed themselves alternately on one side of the laminate. The resulting laminate was heated at 350° C. in a nitrogen atmosphere so as to burn off the binder and then fired at the firing temperature shown in Table 3 for 2 hours in a reducing gas atmosphere composed of $H_2$, $O_2$ and $H_2O$, with the oxygen partial pressure being $10^{-9}$–$10^{-12}$ MPa. Thus there was obtained a sintered body.

The sintered body had its both ends coated with a silver paste, which was subsequently baked at 600° C. in a nitrogen atmosphere. This step formed external electrodes electrically connected to internal electrodes. Thus there was obtained a laminated ceramics capacitor.

The thus obtained laminated ceramics capacitor measures 1.6 mm wide, 3.2 mm long, and 1.2 mm thick, and the dielectric ceramics layer held between the internal electrodes is 8 μm thick.

The effective dielectric ceramics layers count 19, and the area of opposed electrodes for each layer is 2.1 $mm^2$.

The laminated ceramics capacitor was tested for the following characteristic properties.

Electrostatic capacity (C) and dielectric loss (tan δ), measured at 1 kHz and 1 $V_{rms}$ and 20° C. with an automatic bridge-type meter. Permittivity (ε) was calculated from the electrostatic capacity.

Insulation resistance (R), measured at 25° C. and 125° C. with an insulation resistance meter by application of DC voltages of 16V and 160V for 2 minutes. CR products at different temperatures and voltages were calculated from the electrostatic capacity (C) and insulation resistance (R).

Rate of change with temperature in electrostatic capacity, expressed in terms of $\Delta C/C_{20° C.}$ and $\Delta C/C_{25° C.}$, the former representing the rate of change at –25° C. and 85° C. relative to the electrostatic capacity at 20° C., and the latter representing the rate of change at –55° C. and 125° C. relative to the electrostatic capacity at 25° C.

Maximum rate of change ($|\Delta C|_{max}$), in terms of absolute value, in the range from –55° C. to 125° C.

Life under load at high temperatures was tested (on 36 specimens for each test) by measuring the change with time in insulation resistance that occurred when a DC voltage of 100V was applied at 150° C. Time required for each specimen to decrease in insulation resistance (R) below $10^6$ Ω is regarded as its life. The results are given in terms of average life time.

TABLE 2

$(1 - \alpha - \beta - \gamma)\{BaO\}_m TiO_2 + \alpha M_2O_3 + \beta Re_2O_3 + \gamma(Mn_{1-x-y}Ni_xCo_y)O$

| Sample No. | BaTiO3 | M Sc | M Y | Re Sm | Re Eu | α+β | β | β/α | γ | γ/(α+β) | x | y | x+y | m | MgO | Oxide glass (pbw) |
|---|---|---|---|---|---|---|---|---|---|---|---|---|---|---|---|---|
| 1* | A | | | | | 0.0000 | 0.0000 | | 0.0300 | | 0.10 | 0.30 | 0.40 | 1.010 | 1.00 | 0.80 |
| 2* | A | | 0.0060 | 0.0020 | | 0.0080 | 0.0020 | 1/3 | 0.0000 | | | | | 1.010 | 1.00 | 0.60 |
| 3* | A | | 0.0055 | | | 0.0055 | 0.0000 | | 0.0200 | 3.6 | 0.10 | 0.20 | 0.30 | 1.015 | 1.00 | 0.50 |
| 4* | A | | 0.0080 | 0.0020 | | 0.0100 | 0.0020 | 1/4 | 0.0250 | 2.5 | 0.10 | 0.30 | 0.40 | 0.990 | 1.00 | 0.50 |
| 5* | A | | 0.0060 | 0.0010 | | 0.0070 | 0.0010 | 1/6 | 0.0200 | 2.9 | 0.20 | 0.20 | 0.40 | 1.000 | 1.50 | 0.80 |
| 6* | A | | 0.0060 | | | 0.0015 | 0.0075 | 0.0015 | 1/4 | 0.0200 | 2.7 | 0.20 | 0.20 | 0.40 | 1.010 | 0.20 | 0.80 |
| 7* | A | | 0.0080 | 0.0010 | | 0.0090 | 0.0010 | 1/8 | 0.0250 | 2.8 | 0.10 | 0.30 | 0.40 | 1.010 | 1.00 | 0.00 |
| 8 | A | | 0.0020 | 0.0005 | | 0.0025 | 0.0005 | 1/4 | 0.0025 | 1.0 | 0.05 | 0.10 | 0.15 | 1.035 | 1.00 | 0.50 |
| 9 | A | | 0.0200 | 0.0050 | | 0.0250 | 0.0050 | 1/4 | 0.0500 | 2.0 | 0.20 | 0.20 | 0.40 | 1.005 | 0.60 | 0.80 |
| 10 | A | | 0.0060 | | | 0.0015 | 0.0075 | 0.0015 | 1/4 | 0.0300 | 4.0 | 0.20 | 0.30 | 0.50 | 1.015 | 1.50 | 1.00 |
| 11 | A | | 0.0100 | 0.0075 | | 0.0175 | 0.0075 | 3/4 | 0.0350 | 2.0 | 0.10 | 0.30 | 0.40 | 1.005 | 2.00 | 0.80 |
| 12 | A | | 0.0060 | 0.0060 | | 0.0120 | 0.0060 | 1 | 0.0100 | 0.8 | 0.00 | 0.00 | 0.00 | 1.010 | 1.50 | 1.00 |
| 13 | A | 0.0015 | 0.0060 | 0.0025 | | 0.0100 | 0.0025 | 1/3 | 0.0100 | 1.0 | 0.60 | 0.00 | 0.60 | 1.010 | 1.50 | 1.20 |
| 14 | B | | 0.0080 | | 0.0020 | 0.0100 | 0.0020 | 1/4 | 0.0200 | 2.0 | 0.00 | 0.60 | 0.60 | 1.010 | 1.20 | 0.80 |
| 15 | A | | 0.0050 | 0.0010 | | 0.0060 | 0.0010 | 1/5 | 0.0150 | 2.5 | 0.10 | 0.30 | 0.40 | 1.005 | 5.00 | 1.50 |
| 16 | C | | 0.0080 | 0.0015 | 0.0005 | 0.0100 | 0.0020 | 1/4 | 0.0350 | 3.5 | 0.20 | 0.20 | 0.40 | 1.015 | 0.50 | 0.20 |
| 17 | A | 0.0005 | 0.0055 | 0.0010 | 0.0010 | 0.0080 | 0.0020 | 1/3 | 0.0250 | 3.1 | 0.10 | 0.10 | 0.20 | 1.005 | 1.00 | 3.00 |
| 18 | A | | 0.0040 | | 0.0050 | 0.0090 | 0.0050 | 9/8 | 0.0300 | 3.3 | 0.20 | 0.20 | 0.40 | 1.010 | 1.50 | 0.80 |
| 19* | A | | 0.0250 | | 0.0050 | 0.0300 | 0.0050 | 1/5 | 0.0300 | 1.0 | 0.10 | 0.30 | 0.40 | 1.015 | 1.50 | 1.50 |
| 20* | A | | 0.0150 | 0.0050 | | 0.0200 | 0.0050 | 1/3 | 0.0750 | 3.8 | 0.10 | 0.10 | 0.20 | 1.010 | 1.00 | 0.80 |
| 21* | A | | 0.0060 | | 0.0010 | 0.0070 | 0.0010 | 1/6 | 0.0450 | 6.4 | 0.20 | 0.10 | 0.30 | 1.010 | 1.50 | 0.80 |
| 22* | A | | 0.0040 | 0.0100 | | 0.0140 | 0.0100 | 5/2 | 0.0350 | 2.5 | 0.10 | 0.10 | 0.20 | 1.010 | 1.00 | 0.80 |
| 23* | A | | 0.0080 | 0.0020 | | 0.0100 | 0.0020 | 1/4 | 0.0100 | 1.0 | 1.00 | 0.00 | 1.00 | 1.010 | 1.20 | 0.80 |
| 24* | A | | 0.0060 | | 0.0015 | 0.0075 | 0.0015 | 1/4 | 0.0120 | 1.6 | 0.00 | 1.00 | 1.00 | 1.015 | 1.50 | 0.80 |
| 25* | A | | 0.0060 | 0.0020 | | 0.0080 | 0.0020 | 1/3 | 0.0100 | 1.3 | 0.50 | 0.50 | 1.00 | 1.015 | 1.00 | 1.00 |
| 26* | A | | 0.0060 | 0.0015 | | 0.0075 | 0.0015 | 1/4 | 0.0250 | 3.3 | 0.10 | 0.10 | 0.20 | 1.050 | 1.00 | 1.50 |
| 27* | A | | 0.0080 | 0.0020 | | 0.0100 | 0.0020 | 1/4 | 0.0150 | 1.5 | 0.05 | 0.10 | 0.15 | 1.010 | 7.00 | 1.00 |
| 28* | A | | 0.0050 | 0.0010 | | 0.0060 | 0.0010 | 1/5 | 0.0200 | 3.3 | 0.20 | 0.20 | 0.40 | 1.005 | 1.00 | 5.00 |
| 29* | D | | 0.0050 | | 0.0010 | 0.0060 | 0.0010 | 1/5 | 0.0200 | 3.3 | 0.10 | 0.10 | 0.20 | 1.015 | 1.50 | 1.00 |

Humidity resistance under load was tested (on 72 specimens for each test) by measuring the change with time in insulation resistance that occurred when a DC voltage of 16V was applied at 121° C. and 2 atmospheric pressure (100% RH). The results are expressed in terms of the number of the defective specimens, i.e., those which decreased in insulation resistance (R) below $10^6$ Ω within 250 hours.

The results of the above-mentioned tests are shown in Table 3. In Tables 2 and 3, those samples not pertaining to the present invention are indicated by an asterisk.

than 3000, a dielectric loss tangent (tan δ) higher than 2.5%, a high rate of change with time in electrostatic capacity, and an extremely short life. Sample No. 19, in which the amount (α+β) of ($M_2O_3$+$Re_2O_3$) is more than about 0.025, has a permittivity (ε) lower than 3000, a low insulation resistance, and a short average life. In addition, it needs a high sintering temperature and gives rise to some defectives in the humidity load test.

Sample No. 2, in which the amount (γ) of (Mn, Ni, Co)O is less than about 0.0025, is subject to reduction during firing in a reducing atmosphere. This reduction changes the ceram-

TABLE 3

| Sample No. | Firing temp. (°C.) | Permittivity (ε) | Dielectric loss (tan δ) (%) | Rate of change with temp. in capacity ΔC/$C_{20°C}$ (%) −25° C. | 85° C. | Rate of change with temp. in capacity ΔC/$C_{25°C}$ (%) −55° C. | 125° C. | max | CR product at 25° C. (ΩF) 16 V | 160 V | CR product at 125° C. (ΩF) 16 V | 160 V | Average life time (h) | Number of defectives |
|---|---|---|---|---|---|---|---|---|---|---|---|---|---|---|
| 1* | 1280 | 2870 | 3.3 | −4.9 | 18.1 | −10.8 | 13.3 | 25.5 | 6200 | 2060 | 2170 | 540 | 41 | 0/72 |
| 2* | 1300 | | | Unmeasurable due to change into semiconductor | | | | | | | | | | |
| 3* | 1300 | 3540 | 2.2 | −0.2 | −7.8 | −0.8 | −9.5 | 9.5 | 7040 | 3000 | 2750 | 760 | 326 | 0/72 |
| 4* | 1280 | | | Unmeasurable due to change into semiconductor | | | | | | | | | | |
| 5* | 1280 | 3340 | 2.3 | −0.1 | −9.6 | −0.6 | −10.8 | 10.8 | 5150 | 1720 | 1550 | 420 | 308 | 0/72 |
| 6* | 1300 | 3520 | 2.3 | 1.4 | −14.7 | 1.2 | −18.2 | 19.4 | 4060 | 1490 | 1380 | 300 | 210 | 0/72 |
| 7* | 1350 | | | Unmeasurable due to insufficient sintering | | | | | | | | | | |
| 8 | 1300 | 3280 | 2.0 | −0.2 | −9.6 | −0.6 | −10.9 | 10.9 | 7280 | 2956 | 2660 | 760 | 572 | 0/72 |
| 9 | 1300 | 3120 | 1.9 | 0.2 | −8.0 | −0.4 | −9.2 | 9.2 | 6030 | 2480 | 2150 | 550 | 666 | 0/72 |
| 10 | 1280 | 3240 | 1.6 | 0.4 | −9.0 | −0.2 | −10.0 | 10.0 | 7480 | 2970 | 2600 | 660 | 550 | 0/72 |
| 11 | 1300 | 3030 | 1.5 | 0.7 | −9.2 | 1.0 | −13.0 | 13.0 | 6750 | 2700 | 2340 | 600 | 619 | 0/72 |
| 12 | 1300 | 3240 | 1.5 | 0.5 | −9.5 | 0.8 | −13.5 | 13.5 | 6120 | 2080 | 2100 | 530 | 632 | 0/72 |
| 13 | 1280 | 3270 | 1.7 | 0.1 | −8.5 | −0.5 | −9.2 | 9.2 | 6250 | 2480 | 2190 | 560 | 676 | 0/72 |
| 14 | 1300 | 3110 | 1.6 | 0.2 | −7.4 | −0.6 | −8.5 | 8.5 | 7860 | 3150 | 2780 | 740 | 515 | 0/72 |
| 15 | 1300 | 3050 | 1.4 | −0.9 | −6.0 | −1.8 | −7.2 | 7.2 | 6500 | 2510 | 2170 | 560 | 595 | 0/72 |
| 16 | 1300 | 3190 | 1.8 | −0.2 | −8.3 | −0.9 | −9.1 | 9.1 | 6860 | 2730 | 2320 | 600 | 600 | 0/72 |
| 17 | 1280 | 3150 | 1.3 | 0.9 | −6.6 | 0.1 | −11.9 | 11.9 | 7030 | 2860 | 2460 | 610 | 580 | 0/72 |
| 18 | 1300 | 3270 | 1.6 | 1.1 | −9.8 | 1.6 | −14.8 | 14.8 | 7150 | 2810 | 2640 | 600 | 587 | 0/72 |
| 19* | 1350 | 2250 | 1.8 | −0.1 | −7.1 | 0.9 | −8.6 | 8.6 | 4860 | 1520 | 1470 | 350 | 233 | 11/72 |
| 20* | 1300 | 3050 | 2.0 | 0.4 | −8.4 | −0.5 | −9.2 | 9.2 | 6120 | 1860 | 1600 | 440 | 350 | 0/72 |
| 21* | 1300 | 3500 | 2.0 | 1.6 | −12.6 | 1.1 | −18.8 | 18.8 | 6080 | 2110 | 2020 | 520 | 526 | 0/72 |
| 22* | 1300 | 3340 | 2.0 | 2.5 | −11.6 | 3.0 | −17.1 | 17.1 | 6680 | 2540 | 2280 | 580 | 560 | 0/72 |
| 23* | 1300 | 3290 | 1.9 | 0.1 | −9.8 | −0.3 | −11.8 | 11.8 | 4660 | 1360 | 1250 | 370 | 198 | 0/72 |
| 24* | 1300 | 3120 | 1.5 | −0.4 | −7.7 | −1.2 | −8.7 | 8.7 | 4840 | 1190 | 1040 | 310 | 228 | 0/72 |
| 25* | 1300 | 3280 | 1.8 | 1.1 | −9.7 | 0.4 | −12.3 | 12.3 | 3890 | 1140 | 960 | 250 | 179 | 0/72 |
| 26* | 1350 | | | Unmeasurable due to insufficient sintering | | | | | | | | | | |
| 27* | 1350 | 2510 | 1.0 | −0.3 | 6.1 | −1.2 | −7.2 | 7.2 | 5050 | 1640 | 1380 | 390 | 520 | 15/72 |
| 28* | 1260 | 2130 | 1.8 | 1.2 | −12.8 | 0.8 | −18.6 | 18.6 | 6880 | 2410 | 2180 | 510 | 542 | 0/72 |
| 29* | 1300 | 2520 | 1.8 | 0.6 | −5.3 | 0.5 | −6.6 | 6.6 | 7010 | 2660 | 2220 | 550 | 505 | 0/72 |

It is apparent from Tables 1 to 3 that the laminated ceramic capacitors pertaining to the present invention have a permittivity (ε) higher than 3000, a dielectric loss tangent (tan δ) lower than 2.5%, and a rate of change with temperature in electrostatic capacity that meets the B specification prescribed in JIS in the temperature range from −25° C. to 85° C. and also meets the X7R specification prescribed in EIA in the temperature range from −55° C. to 125° C.

In addition, the samples of the present invention have a high insulation resistance measured for 16V and 160V at 25° C. which is evidenced by the respective CR products of 6000 Ω·F and 2000 Ω·F. They also have a high insulation resistance measured for 16V and 160V at 125° C. which is evidenced by the respective CR products of 2000 Ω·F and 500 Ω·F. They have an average life longer than 500 hours and pass the humidity load test. They can be formed by sintering at comparatively low temperatures (1300° C. or below).

The compositional variables specified in the present invention are based on the following experimental facts.

Sample No. 1, in which the amount (α+β) of ($M_2O_3$+$Re_2O_3$) is less than about 0.0025, has a permittivity (ε) lower ics into a semiconductor, thereby decreasing its insulation resistance (which is undesirable). Sample No. 20, in which the amount (γ) of (Mn, Ni, Co)O exceeds about 0.05, has a low insulation resistance at 25° C. (with 160 V) and at 125° C. and an average life shorter than 500 hours. Samples Nos. 23 to 25, which do not contain Mn at all, have a low insulation resistance and an average life shorter than 500 hours.

Sample No. 3, in which the value of β is 0, has an average life shorter than 500 hours. Sample No. 22, in which the value of β exceeds about 0.0075, has a high rate of change with temperature in electrostatic capacity. Hence, it does not meet the B specification of JIS and the X7R specification of EIA.

Sample No. 21, in which the ratio γ/(α+β) exceeds about 4, has a high rate of change with temperature in electrostatic capacity (which is not desirable). Samples Nos. 4 and 5, in which the molar ratio (m) of barium titanate is smaller than about 1.000, is subject to change into a semiconductor and has a low insulation resistance and an average life shorter than 500 hours. Sample No. 24, in which the molar ratio (m) exceeds 1.035, is not capable of sintering even at 1350° C.

Sample No. 6, in which the amount of MgO is less than about 0.3 mole, has an insulation resistance lower than 2000 Ω·F (at 25° C. and 160V) and an average life shorter than 500 hours. In addition, it has a rate of change with temperature in electrostatic capacity which does not meet the B specification of JIS and the X7R specification of EIA.

By contrast, Sample No. 27, in which the amount of MgO exceeds about 5 moles, needs a high sintering temperature, has a permittivity lower than 3000, is poor in insulation resistance and fails the humidity load test.

Sample No. 7, in which the amount of oxide glass is less than about 0.2 pbw, is not completely sintered even at 1350° C. By contrast, Sample No. 28, in which the amount of oxide glass exceeds about 3.0 pbw, has a low permittivity and a high rate of change with temperature in electrostatic capacity.

Sample No. 29, in which the amount of alkali metal (as an impurity in barium titanate) exceeds about 0.02 pbw, has a low permittivity.

Although the value of ratio $\beta/\alpha$ is not particularly specified, it should desirably be smaller than or equal to about 1 so that the samples have a rate of change with temperature in electrostatic capacity which meets the specification with a margin to spare.

EXAMPLE 2

A powder of dielectric material was prepared from barium titanate (designated as A in Table 1) and respective starting materials in such amounts to realize the compositional formula 97.3 {BaO}$_{1.010}$·TiO$_2$+0.6 Y$_2$O$_3$+0.1 Sm$_2$O$_3$+0.6 MnO+0.6 NiO+ 0.8 CoO (molar ratio).

This powder was combined with 1.2 moles of MgO. The thus prepared raw material was combined with an oxide glass (having an average particle size smaller than about 1 μm) as shown in Table 4). This oxide glass was prepared in the same manner as in Example 1. The resulting dielectric ceramic composition was made into laminated ceramic capacitors in the same manner as in Example 1 (The laminated ceramic capacitor has internal electrodes and silver external electrodes electrically connected to the internal electrodes). The glass melting temperature was adjusted in the range of 1200°–1500° C.

TABLE 4

| Sample No. | Amount of glass (wt %) | Components of oxide glass (wt %) | | | | |
|---|---|---|---|---|---|---|
| | | Li$_2$O | Si$_z$Ti$_{1-z}$ | z | Al$_2$O$_3$ | ZrO$_3$ |
| 1 | 1.00 | 20 | 80 | 0.3 | 0 | 0 |
| 2 | 0.80 | 10 | 80 | 0.6 | 5 | 5 |
| 3 | 1.00 | 10 | 70 | 0.5 | 20 | 0 |
| 4 | 1.00 | 35 | 45 | 1.0 | 10 | 10 |
| 5 | 1.20 | 45 | 45 | 0.5 | 10 | 0 |
| 6 | 1.00 | 45 | 55 | 0.3 | 0 | 0 |
| 7 | 0.80 | 20 | 70 | 0.6 | 5 | 5 |
| 8 | 1.00 | 20 | 70 | 0.4 | 10 | 0 |
| 9 | 1.00 | 30 | 60 | 0.7 | 5 | 5 |
| 10 | 0.80 | 30 | 60 | 0.8 | 10 | 0 |
| 11 | 1.50 | 40 | 50 | 0.6 | 5 | 5 |
| 12 | 2.00 | 40 | 50 | 0.9 | 0 | 10 |
| 13 * | 1.20 | 10 | 85 | 0.4 | 5 | 0 |
| 14 * | 1.50 | 5 | 75 | 0.6 | 10 | 10 |
| 15 * | 1.00 | 20 | 55 | 0.5 | 25 | 0 |
| 16 * | 1.20 | 45 | 40 | 0.8 | 0 | 15 |
| 17 * | 1.00 | 50 | 45 | 0.7 | 5 | 0 |

TABLE 4-continued

| Sample No. | Amount of glass (wt %) | Components of oxide glass (wt %) | | | | |
|---|---|---|---|---|---|---|
| | | Li$_2$O | Si$_z$Ti$_{1-z}$ | z | Al$_2$O$_3$ | ZrO$_3$ |
| 18 | 0.80 | 25 | 75 | 0.9 | 0 | 0 |
| 19 * | 1.00 | 25 | 75 | 1.0 | 0 | 0 |
| 20 | 1.50 | 35 | 65 | 0.9 | 0 | 0 |
| 21 * | 1.20 | 35 | 65 | 1.0 | 0 | 0 |
| 22 * | 1.00 | 20 | 70 | 0.2 | 0 | 10 |

The composition of the oxide glass is defined by the triangular coordinates shown in FIG. 1.

The laminated ceramics capacitors in this example have the same dimensions as those in Example 1.

The laminated ceramics capacitors were tested for electrical properties as follows:

Electrostatic capacity (C) and dielectric loss (tan δ), measured at 1 kHz and 1 V$_{rms}$ and 20° C. with an automatic bridge-type meter. Permittivity (ε) was calculated from the electrostatic capacity.

Insulation resistance (R), measured at 25° C. and 125° C. with an insulation resistance meter by application of DC voltages of 16V and 160V for 2 minutes. CR products at different temperatures and voltages were calculated from the electrostatic capacity (C) and insulation resistance (R).

Rate of change with temperature in electrostatic capacity, expressed in terms of $\Delta C/C_{20°\ C.}$ and $\Delta C/C_{25°\ C.}$, the former representing the rate of change at –25° C. and 85° C. relative to the electrostatic capacity at 20° C., and the latter representing the rate of change at –55° C. and 125° C. relative to the electrostatic capacity at 25° C.

Maximum rate of change ($|\Delta C|_{max}$), in terms of absolute value, in the range from –55° C. to 125° C.

Life under load at high temperatures was tested (on 36 specimens for each test) by measuring the change with time in insulation resistance that occurred when a DC voltage of 100V was applied at 150° C. Time required for each specimen to decrease in insulation resistance (R) below 10$^6$ Ω is regarded as its life. The results are given in terms of average life time.

Humidity resistance under load was tested (on 72 specimens for each test) by measuring the change with time in insulation resistance that occurred when a DC voltage of 16V was applied at 121° C. and 2 atmospheric pressure (100% RH). The results are expressed in terms of the number of the defective specimens whose insulation resistance (R) decreased below 10$^6$ Ω within 250 hours.

The results of the above-mentioned tests are shown in Table 5. In Tables 4 and 5, those samples not pertaining to the present invention are indicated by an asterisk.

TABLE 5

| Sample No. | Firing temp. (°C.) | Permittivity (ε) | Dielectric loss (tan δ) (%) | Rate of change with temp. in capacity ΔC/C₂₀°C (%) -25° C. | 85° C. | Rate of change with temp. in capacity ΔC/C₂₅°C (%) -55° C. | 125° C. | max | CR product at 25° C. (ΩF) 16 V | 160 V | CR product at 125° C. (ΩF) 16 V | 160 V | Average life time (h) | Number of defectives |
|---|---|---|---|---|---|---|---|---|---|---|---|---|---|---|
| 1 | 1280 | 3270 | 1.8 | −0.3 | −8.7 | −1.0 | −10.7 | 10.7 | 6700 | 2290 | 2010 | 590 | 513 | 0/72 |
| 2 | 1300 | 3380 | 2.0 | 0.0 | −9.0 | −0.2 | −11.4 | 11.4 | 6980 | 2420 | 2150 | 600 | 512 | 0/72 |
| 3 | 1300 | 3170 | 1.6 | −0.4 | −7.9 | −0.7 | −9.8 | 9.8 | 6540 | 2260 | 2010 | 570 | 586 | 0/72 |
| 4 | 1280 | 3280 | 1.6 | 0.3 | −8.6 | 0.0 | −10.9 | 10.9 | 6870 | 2390 | 2090 | 530 | 602 | 0/72 |
| 5 | 1280 | 3160 | 1.7 | −0.9 | 6.3 | −1.7 | −8.0 | 8.0 | 6120 | 2130 | 2060 | 510 | 566 | 0/72 |
| 6 | 1280 | 3120 | 1.6 | −0.8 | −6.9 | −1.3 | −8.7 | 8.7 | 6330 | 2210 | 2160 | 610 | 576 | 0/72 |
| 7 | 1280 | 3110 | 1.6 | −0.2 | −7.6 | −0.9 | −9.2 | 9.2 | 6500 | 2240 | 2010 | 570 | 588 | 0/72 |
| 8 | 1280 | 3260 | 1.6 | 0.1 | −8.1 | −0.3 | −9.7 | 9.7 | 6790 | 2360 | 2100 | 590 | 553 | 0/72 |
| 9 | 1300 | 3300 | 1.7 | −0.1 | −8.2 | −0.5 | −10.5 | 10.5 | 6880 | 2380 | 2100 | 530 | 522 | 0/72 |
| 10 | 1300 | 3360 | 2.0 | −0.1 | −9.3 | −0.3 | −11.9 | 11.9 | 6910 | 2390 | 2380 | 670 | 616 | 0/72 |
| 11 | 1280 | 3120 | 1.7 | −0.4 | −7.9 | −1.4 | −8.8 | 8.8 | 6380 | 2210 | 2110 | 590 | 568 | 0/72 |
| 12 | 1260 | 3440 | 2.1 | 1.0 | −9.2 | 0.3 | −13.3 | 13.3 | 7130 | 2470 | 2420 | 620 | 523 | 0/72 |
| 13* | 1350 | | | | | Unmeasurable due to insufficient sintering | | | | | | | | |
| 14* | 1350 | | | | | Unmeasurable due to insufficient sintering | | | | | | | | |
| 15* | 1350 | 3010 | 1.2 | 0.1 | −9.2 | −0.3 | 13.3 | 6090 | 2130 | 2020 | | 510 | 507 | 31/72 |
| 16* | 1350 | | | | | Unmeasurable due to insufficient sintering | | | | | | | | |
| 17* | 1350 | | | | | Unmeasurable due to insufficient sintering | | | | | | | | |
| 18 | 1300 | 3180 | 1.7 | −0.5 | −8.7 | −1.3 | −10.8 | 10.8 | 7060 | 2430 | 2210 | 610 | 509 | 0/72 |
| 19* | 1350 | 3190 | 1.8 | 0.1 | −8.9 | 0.0 | −12.3 | 12.3 | 6510 | 2310 | 2220 | 580 | 511 | 4/72 |
| 20 | 1280 | 3270 | 1.9 | −0.4 | −8.3 | −1.0 | −9.7 | 9.7 | 6500 | 2260 | 2060 | 540 | 558 | 0/72 |
| 21* | 1350 | 3080 | 1.8 | 0.2 | −9.1 | 0.0 | −13.4 | 13.4 | 5980 | 2100 | 2010 | 590 | 527 | 16/72 |
| 22* | 1350 | 3020 | 1.8 | 0.1 | −9.0 | −0.1 | −12.7 | 12.7 | 6060 | 2170 | 2160 | 510 | 583 | 10/72 |

It is apparent from Tables 4 and 5 that the laminated ceramics capacitors composed of dielectric ceramics layers containing the oxide glass specified in the present invention have a permittivity (ε) higher than 3000, a dielectric loss tangent (tan δ) lower than 2.5%, and a rate of change with temperature in electrostatic capacity that meets the X7R specification prescribed in EIA in the temperature range from −55° C. to 125° C.

In addition, the samples according to the present invention have a high insulation resistance measured for 16V and 160V at 25° C. which is evidenced by the respective CR products of 6000 Ω·F and 2000 Ω·F. They also have a high insulation resistance measured for 16V and 160V at 125° C. which is evidenced by the respective CR products of 2000 Ω·F and 500 Ω·F. They have an average life longer than 500 hours and pass the humidity load test. They can be formed by sintering at comparatively low temperatures (1300° C. or below).

The composition of the oxide glass is specified by the area enclosed by six lines in the triangular coordinates as mentioned above. This is justified by the fact that Samples Nos. 13 to 17 are poor in sinterability and liable to fail the humidity load test. However, the composition corresponding to the line A–F (with z=1.0) is excluded from the scope of the invention. This is justified by the fact that Sample No. 19 has a high sintering temperature and fails the humidity load test. The composition having the value of z smaller than about 0.3 is also excluded from the scope of the invention. This is justified by the fact that Sample No. 22 has a high sintering temperature and fails the humidity load test.

Figure 2:
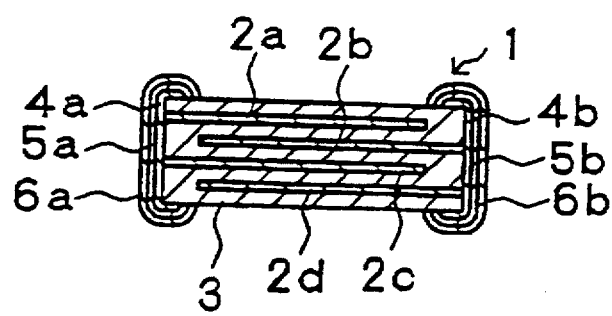
FIG. 2 is a sectional view showing the laminated ceramic capacitor of the present invention.

FIG. 2 is a sectional view showing the laminated ceramics capacitor pertaining to the present invention. The laminated ceramics capacitor 1 is composed of dielectric ceramics layers 3 and internal electrodes 2a, 2b, 2c and 2d, which are placed alternately on top of the other. The laminated ceramics capacitor 1 has external electrodes 4a and 4b which are electrically connected to the internal electrodes 2a, 2b, 2c and 2d. The external electrodes 4a and 4b have another external electrodes 5a and 5b of nickel or copper formed thereon by plating. The external electrodes 5a and 5b have yet another external electrodes 6a and 6b of solder or tin formed thereon by plating. The laminated ceramic capacitor 1 can be obtained by the manufacturing process mentioned in Example 1 or 2. The one shown in FIG. 2 has the external electrodes of three-layer structure; however, the external electrodes may be of single-layer structure or multi-layer structure depending on the desired usage of the capacitor.

Although barium titanate in powder form prepared by the oxalic acid method was used in the above-mentioned examples, it may be replaced by the one prepared by the alkoxide method or hydrothermal method so as to improve the characteristic properties of the laminated ceramic capacitor. In addition, yttrium, cobalt and nickel may be used in the form of alkoxide solution or organometal solution in place of oxide powder without any adverse effect of the characteristic properties so long as they are used in specified amounts for the dielectric ceramics composition.

The internal electrodes may be formed by any of screen printing, vacuum deposition and plating.

The external electrodes may be formed from the same material as used for the internal electrodes. They may also be formed from silver, palladium or silver-palladium alloy, which may be selected depending on the intended usage of the laminated ceramics capacitor.

In the examples mentioned above, the external electrodes were formed by coating with metal powder paste and subsequent baking after firing. Alternatively, they may be formed by coating prior to firing and subsequent baking simultaneous with the firing of the laminated ceramics capacitor.

The external electrodes of silver may also be coated sequentially with a layer of nickel or copper and a layer of solder or tin which are formed by plating.

[Effect of the invention]

According to the present invention, the dielectric ceramic capacitor can be formed by firing at 1260°–1300° C. in a neutral or reducing atmosphere. Yet, it has an insulation resistance and an electrostatic capacity such that their product (CR product) is higher than 6000 Ω·F. This value changes only a little even in a high electric field. It has a high rated voltage with high reliability and exhibits a permittivity higher than 3000 even though the dielectric ceramics layers are made thinner.

The dielectric ceramic composition of the present invention can be made into laminated ceramic capacitors which have the above-mentioned characteristic properties and a temperature-dependent electrostatic capacity which meets the B specification of JIS and the X7R specification of EIA. These outstanding properties remain unchanged even at high temperatures under high humidity.

The laminated ceramics capacitor of the present invention has internal electrodes of nickel or nickel alloy. Therefore, it is less expensive than the conventional one that has internal electrodes of precious metal such as palladium. Yet, it exhibits good weather-resistance performance such as load characteristics at high temperatures under high humidity.

What is claimed is:

1. A dielectric ceramic composition which comprises a primary component composed of a barium titanate containing less than about 0.02 wt % of alkali metal oxide as an impurity expressed by the compositional formula:

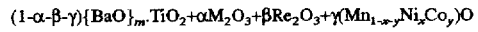
$(1-\alpha-\beta-\gamma)\{BaO\}_m \cdot TiO_2 + \alpha M_2O_3 + \beta Re_2O_3 + \gamma(Mn_{1-x-y}Ni_xCo_y)O$ (where $M_2O_3$ denotes $Sc_2O_3$ or $Y_2O_3$ or both,
$Re_2O_3$ denotes $Sm_2O_3$ or $Eu_2O_3$ or both,
$0.0025 \leq \alpha+\beta \leq 0.025$
$0 < \beta \leq 0.0075$
$0.0025 \leq \gamma \leq 0.05$
$\gamma/(\alpha+\beta) \leq 4$
$0 \leq x < 1.0$
$0 \leq y < 1.0$
$0 \leq x+y < 1.0$
$1.0000 < m \leq 1.035$ from about 0.5 to 5 moles per 100 moles of primary component of magnesium oxide; and from about 0.2 to 3 parts by weight per 100 parts of said primary component and magnesium oxide of an oxide glass represented by $Li_2O-(Si,Ti)O_2-Al_2O_3-ZrO_2$.

2. A dielectric ceramic composition as defined in claim 1, wherein the oxide glass is of the general formula of $pLi_2O$-$q(Si_zTi_{1-z})O_2$-$rM$ where p, q, and r denote the mol % of the respective constituents, z is $0.30 \leq z \leq 1.0$, M is $Al_2O_3$ or $ZrO_2$ or both, and p, q, and r are within the area enclosed by the polygon having apexes defined as follows in a triangular composition diagram A (20, 80, 0)
B (10, 80, 10)
C (10, 70, 20)
D (35, 45, 20)
E (45, 45, 10)
F (45, 55, 0)

provided that $0.3 \leq z < 1.0$ for the composition corresponding to the line A-F.

3. A dielectric ceramic composition as defined in claim 2, wherein z is about 0.4 to 0.8.

4. A dielectric ceramic composition as defined in claim 3, wherein the impurities are less than about 0.015%, $0.0075 \leq \alpha+\beta \leq 0.0175$, $0.0005 < \beta \leq 0.006$, $\beta/\alpha \leq 1$, $0.015 \leq \gamma \leq 0.035$, $\gamma/(\alpha+\beta) \leq 3.3$, $0.05 \leq x \leq 0.6$, $0.1 \leq y \leq 0.6$, $0.2 \leq x+y \leq 0.6$, $1.005 < m \leq 1.015$, the amount of MgO is about 0.6–2 moles and the amount of oxide glass is about 0.5–1.5 parts.

5. A laminated ceramic capacitor comprising a plurality of dielectric ceramic layers, a plurality of internal electrodes formed between said dielectric ceramic layers such that an edge is exposed at an end of the ceramic layers, and external electrodes electrically connected to the edges of said internal electrodes, wherein said dielectric ceramic layers comprise a dielectric ceramic composition and said internal electrodes are made from nickel or nickel alloy, wherein said dielectric ceramic composition which comprises a primary component composed of a barium titanate containing less than about 0.015 wt % of alkali metal oxide as an impurity expressed by the compositional formula:

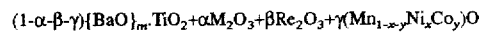
$(1-\alpha-\beta-\gamma)\{BaO\}_m \cdot TiO_2 + \alpha M_2O_3 + \beta Re_2O_3 + \gamma(Mn_{1-x-y}Ni_xCo_y)O$ (where $M_2O_3$ denotes $Sc_2O_3$ or $Y_2O_3$ or both,
$Re_2O_3$ denotes $Sm_2O_3$ or $Eu_2O_3$ or both.
$0.0075 \leq \alpha+\beta \leq 0.0175$
$0.0005 < \beta \leq 0.006$
$0.015 \leq \gamma \leq 0.035$
$\gamma/(\alpha+\beta) \leq 3.3$
$0.05 \leq x < 0.6$
$0.1 \leq y < 0.6$
$0.2 \leq x+y < 0.6$
$1.005 < m \leq 1.015$;

from about 0.6 to 2 moles per 100 moles of primary component of magnesium oxide; and from about 0.5 to 1.5 parts by weight per 100 parts of said primary component and magnesium oxide of an oxide class represented by $pLi_2O$-$q(Si_zTi_{1-z})O_2$-$rM$ where p, q, and r denote the mol % of the respective constituents, z is about 0.4 to 0.8, M is $Al_2O_3$ or $ZrO_2$ or both, and p, q, and r are within the area enclosed by the polygon having apexes defined as follows in a triangular composition diagram A (20, 80, 0)
B (10, 80, 10)
C (10, 70, 20)
D (35, 45, 20)
E (45, 45, 10)
F (45, 55, 0).

6. The ceramic capacitor as claimed in claim 5 having two separate outer electrodes on the outside surface of the capacitor, each of which is electrically connected to an inner electrode.

7. The ceramic capacitor as claimed in claim 6, wherein the outer electrodes comprise a sintered layer of an electroconductive metal powder optionally containing a glass frit.

8. The ceramic capacitor as claimed in claim 7, wherein the outer electrodes are composed of a first sintered layer of an electroconductive metal powder optionally containing a glass frit added thereto, and a second plated layer formed on the first layer.

9. A laminated ceramic capacitor comprising a plurality of dielectric ceramic layers, a plurality of internal electrodes formed between said dielectric ceramic layers such that an edge is exposed at an end of the ceramic layers, and external electrodes electrically connected to the edges of said internal electrodes, wherein said dielectric ceramic layers comprise a dielectric ceramic composition and said internal electrodes are made from nickel or nickel alloy wherein said dielectric ceramic composition which comprises a primary component composed of a barium titanate containing less than about 0.02 wt % of alkali metal oxide as an impurity expressed by the compositional formula:

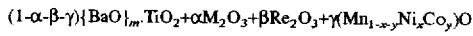

(where $M_2O_3$ denotes $Sc_2O_3$ or $Y_2O_3$ or both,
$Re_2O_3$ denotes $Sm_2O_3$ or $Eu_2O_3$ or both,
$0.0025 \leq \alpha+\beta \leq 0.025$
$0 < \beta \leq 0.0075$
$0.0025 \leq \gamma \leq 0.05$
$\gamma/(\alpha+\beta) \leq 4$
$0 \leq x < 1.0$
$0 \leq y < 1.0$
$0 \leq x+y < 1.0$
$1.0000 < m \leq 1.035$ from about 0.5 to 5 moles per 100 moles of primary component of magnesium oxide; and from about 0.2 to 3 parts by weight per 100 parts of said primary component and magnesium oxide of an oxide glass represented by $pLi_2O-q(Si_zTi_{1-z})O_2-rM$ where p, q, and r denote the mol % of the respective constituents, $0.30 \leq z \leq 1.0$. M is $Al_2O_3$ or $ZrO_2$ or both, and p, q, and r are within the area enclosed by the polygon having apexes defined as follows in a triangular composition diagram A (20, 80, 0)
B (10, 80, 10)
C (10, 70, 20)
D (35, 45, 20)
E (45, 45, 10)
F (45, 55, 0)

provided that $0.3 \leq z \leq 1.0$ for the composition corresponding to the line A–F.

10. The ceramic capacitor as claimed in claim 9, having two separate outer electrodes on the outside surface of the capacitor, each of which is electrically connected to an inner electrode.

11. The ceramic capacitor as claimed in claim 10, wherein the outer electrodes comprise a sintered layer of an electroconductive metal powder optionally containing a glass frit.

12. The ceramic capacitor as claimed in claim 11, wherein the outer electrodes are composed of a first sintered layer of an electroconductive metal powder optionally containing a glass frit added thereto, and a second plated layer formed on the first layer.

13. A laminated ceramic capacitor comprising a plurality of dielectric ceramic layers, a plurality of internal electrodes formed between said dielectric ceramic layers such that an edge is exposed at an end of the ceramic layers, and external electrodes electrically connected to the edges of said internal electrodes, wherein said dielectric ceramic layers comprise a dielectric ceramic composition and said internal electrodes are made from nickel or nickel alloy wherein said dielectric ceramic composition which comprises a primary component composed of a barium titanate containing less than about 0.02 wt % of alkali metal oxide as an impurity expressed by the compositional formula:

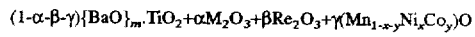

(where $M_2O_3$ denotes $Sc_2O_3$ or $Y_2O_3$ or both,
$Re_2O_3$ denotes $Sm_2O_3$ or $Eu_2O_3$ or both,
$0.0025 \leq \alpha+\beta \leq 0.025$
$0 < \beta \leq 0.0075$
$0.0025 \leq \gamma \leq 0.05$
$\gamma/(\alpha+\beta) \leq 4$
$0 \leq x < 1.0$
$0 \leq y < 1.0$
$0 \leq x+y < 1.0$
$1.0000 < m \leq 1.035$ from about 0.5 to 5 moles per 100 moles of primary component of magnesium oxide; and from about 0.2 to 3 parts by weight per 100 parts of said primary component and magnesium oxide of an oxide glass represented by $Li_2O-(Si,Ti)O_2-Al_2O_3-ZrO_2$.

14. The ceramic capacitor as claimed in claim 13 having two separate outer electrodes on the outside surface of the capacitor, each of which is electrically connected to an inner electrode.

15. The ceramic capacitor as claimed in claim 14, wherein the outer electrodes comprise a sintered layer of an electroconductive metal powder optionally containing a glass frit.

16. The ceramic capacitor as claimed in claim 15, wherein the outer electrodes are composed of a first sintered layer of an electroconductive metal powder optionally containing a glass frit added thereto, and a second plated layer formed on the first layer.

* * * * *